United States Patent
Park

(10) Patent No.: US 10,140,060 B2
(45) Date of Patent: *Nov. 27, 2018

(54) MEMORY SYSTEM INCLUDING A NONVOLATILE MEMORY AND A VOLATILE MEMORY, AND PROCESSING METHOD USING THE MEMORY SYSTEM

(71) Applicant: SEJONG UNIVERSITY INDUSTRY ACADEMY COOPERATION FOUNDATION, Seoul (KR)

(72) Inventor: Gi Ho Park, Seoul (KR)

(73) Assignee: SEJONG UNIVERSITY INDUSTRY ACADEMY COOPERATION FOUNDATION, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/205,807

(22) Filed: Jul. 8, 2016

(65) Prior Publication Data
US 2016/0321013 A1 Nov. 3, 2016

Related U.S. Application Data

(63) Continuation of application No. 13/932,081, filed on Jul. 1, 2013, now Pat. No. 9,411,719, which is a (Continued)

(30) Foreign Application Priority Data

Dec. 31, 2010 (KR) .................. 10-2010-0140281

(51) Int. Cl.
G06F 3/06 (2006.01)
G06F 12/02 (2006.01)
(Continued)

(52) U.S. Cl.
CPC .......... *G06F 3/0659* (2013.01); *G06F 3/0611* (2013.01); *G06F 3/0635* (2013.01); (Continued)

(58) Field of Classification Search
CPC .......................... G06F 12/08; G06F 12/0811
See application file for complete search history.

(56) References Cited

U.S. PATENT DOCUMENTS

2005/0235131 A1* 10/2005 Ware ................... G06F 12/0292
711/203
2008/0109592 A1* 5/2008 Karamcheti .......... G06F 9/5016
711/103
2011/0066790 A1* 3/2011 Mogul .................. G06F 12/023
711/103

FOREIGN PATENT DOCUMENTS

JP 2003-526135 A 9/2003
JP 2004-523049 A 7/2004
(Continued)

OTHER PUBLICATIONS

International Search Report for PCT/KR2011/004259 dated Jan. 11, 2012.

*Primary Examiner* — Prasith Thammavong
*Assistant Examiner* — Edmund H Kwong

(57) ABSTRACT

A memory system having multiple memory layers includes a first memory layer comprising a volatile memory, a second memory layer comprising a first sub-memory and a second sub-memory. In response to a reference failure that occurred in the first memory layer, to which a read reference failed data and a write reference failed data are respectively loaded from lower level memory layer.

16 Claims, 8 Drawing Sheets

Related U.S. Application Data continuation of application No. PCT/KR2011/004259, filed on Jun. 10, 2011.

(51) Int. Cl.
    *G06F 12/0866*     (2016.01)
    *G06F 12/0897*     (2016.01)

(52) U.S. Cl.
    CPC ........ *G06F 3/0685* (2013.01); *G06F 12/0246* (2013.01); *G06F 12/0866* (2013.01); *G06F 12/0897* (2013.01); *G06F 2212/214* (2013.01)

(56) References Cited

FOREIGN PATENT DOCUMENTS

| | | |
|---|---|---|
| KR | 10-2009-0009018 A | 1/2009 |
| KR | 10-2010-0005539 A | 1/2010 |

* cited by examiner

| | Cache | Norm. Density | Latency (cycles) | Dyn. eng. (nj) | Static power(W) |
|---|---|---|---|---|---|
| VOLATILE MEMORY | SRAM(1MB) | 1 | 8 | 0.388 | 1.36 |
| | eDRAM(4MB) | 4 | 24 | 0.72 | 0.4 |
| NONVOLATILE MEMORY | MRAM(4MB) | 4 | read:20 write:60 | read:0.4 write:2.3 | 0.15 |
| | PRAM(16MB) | 16 | read:40 write:200 | read:0.8 write:1.5 | 0.3 |

MEMORY SYSTEM INCLUDING A NONVOLATILE MEMORY AND A VOLATILE MEMORY, AND PROCESSING METHOD USING THE MEMORY SYSTEM

CROSS REFERENCE TO RELATED APPLICATIONS

The present application is a continuation of and claims priority to U.S. application Ser. No. 13/932,081 filed Jul. 1, 2013, which is a continuation of PCT/KR2011/004259 filed Jun. 10, 2011, which claims priority to Korean Application No. 10-2010-0140281 filed Dec. 31, 2010, incorporated by reference herein for all purposes.

TECHNICAL FIELD

The present disclosure relates to a memory system including a nonvolatile memory, a volatile memory and an operating method thereof, more particularly, a system including a nonvolatile memory and a volatile memory for loading data corresponding to a read reference, a write reference, and an operating method thereof.

BACKGROUND ART

Recently, various types of electronic devices are being used widely. Especially, with the development of communication technologies, mobile devices such as smart phones, personal digital assistants (PDAs) and tablet PCs, as well as computers such as desktops and laptops have become popular.

These electronic devices typically include memories for executing programs etc. Performances and sizes of the electronic devices may be affected by performances and sizes of the memories.

FIG. 1 illustrates a hierarchical memory structure applied to a prior art memory system.

A memory system 1 according to the conventional technology includes a L1/L2 cache memory layer 10, a main memory layer 20 and a storage device 30, and provides data to a central processing unit (CPU).

The L1/L2 cache memory layer 10 and the main memory layer 20 consist of volatile memories such as SRAM and DRAM. The storage device 30 consists of nonvolatile memories such as a flash memory and a hard disk drive (HDD).

In general, a high-priced memory with fast read/write speeds is used for a memory in an upper layer of the memory layer structure. A low-cost memory with relatively slow read/write speeds is used for a memory in a lower layer of the memory layer structure. In the embodiment shown in FIG. 1, the L1/L2 cache memory layer 10 is the uppermost memory layer, and the storage device 30 is the lowermost memory layer.

In the conventional technology as shown in FIG. 1, the CPU 40 acquires data for execution of a programs etc. from the storage device 30. The CPU 40 stores the acquired data in the L1/L2 cache memory layer 10 and the main memory layer 20.

To perform data read or write operations, the CPU 40 requests the L1/L2 cache memory layer 10 for the necessary data, i.e., a memory reference. If the requested data does not exist in the L1/L2 cache memory layer 10, a reference failure (cache miss) may occur.

If a reference failure (cache miss) occurs, the main memory layer 20 is in turn requested to handle the read reference or write reference operation for the data for which the reference failure occurred.

As described above, according to the conventional technology, when a reference failure occurs in the uppermost memory layer, e.g., the L1/L2 cache memory layer, the read or write reference is performed in the main memory layer, which is a lower layer than the uppermost memory layer. Both the uppermost memory layer and the main memory layer consist of volatile memories.

A volatile memory and a nonvolatile memory have different characteristics with respect to density, read and write speeds, power consumption etc. In general, read and write speeds of the volatile memory are faster than those of the nonvolatile memory. Density of the nonvolatile memory is higher than that of the volatile memory.

Recently, as the development of nonvolatile memories is being actively made, access speeds of the nonvolatile memories are being increasingly improved. In particular, the difference between the read speeds of the nonvolatile memories and those of the volatile memories continues to be significantly decreased. Accordingly, it is desired to develop a memory system which includes a nonvolatile memory as well as a volatile memory, and can enjoy the above-described strong characteristics of both the nonvolatile memory and the volatile memory.

DISCLOSURE OF THE INVENTION

Problems to be Solved by the Invention

An illustrative embodiment of the present disclosure realizes a high-performance and low-power memory system, which has a separate structure consisting of a read memory layer made of a nonvolatile memory and a write memory layer made of a volatile memory and take advantage of different operation characteristics of the volatile memory and the nonvolatile memory.

Means for Solving the Problems

A memory system having multiple memory layers includes a first memory layer comprising a volatile memory, and a second memory layer comprising a first sub-memory and a second sub-memory, in response to a reference failure that occurred in the first memory layer, to which read reference failed data and write reference failed data are respectively loaded from a storage device of a lower memory layer.

A memory system having multiple memory layers includes a first memory layer consisting of a volatile memory, and a second memory layer comprising a first sub-memory and a second sub-memory. In response to a memory reference failure that occurred in the first memory layer, read reference failed data and write reference failed data are loaded to the second sub-memory from a storage device of a lower memory layer. Among the data loaded to the second sub-memory, the read reference failed data is first replaced and stored in the first sub-memory.

A memory system having multiple layers includes a first memory layer that transmits its stored data to a central processing unit (CPU), and a second memory layer which, in response to a reference failure that occurred in the first memory layer, loads read reference failed data and write reference failed data from a storage device of a lower memory layer, The second memory layer comprises multiple memories having different read and write speeds one another.

Effect of the Invention

According to the above-described means to solve the technical problems, data to which a read reference is made are loaded to a nonvolatile memory having higher density and an improved read speed performance, while data to which a write reference is made are loaded to a volatile memory having an excellent write speed compared to the nonvolatile memory. In this way, a highly efficient memory system using the advantages of both the nonvolatile memory and the volatile memory can be provided.

Also, by knowing in advance the number of read references or write references that occur per data, data to which a read reference is mostly made can be stored in the nonvolatile memory, while data to which a write reference is mostly made can be loaded to the volatile memory. As a result, the speed for processing references and the lifetime of the memories can be further improved.

BEST MODE FOR CARRYING OUT THE INVENTION

Figure 1:
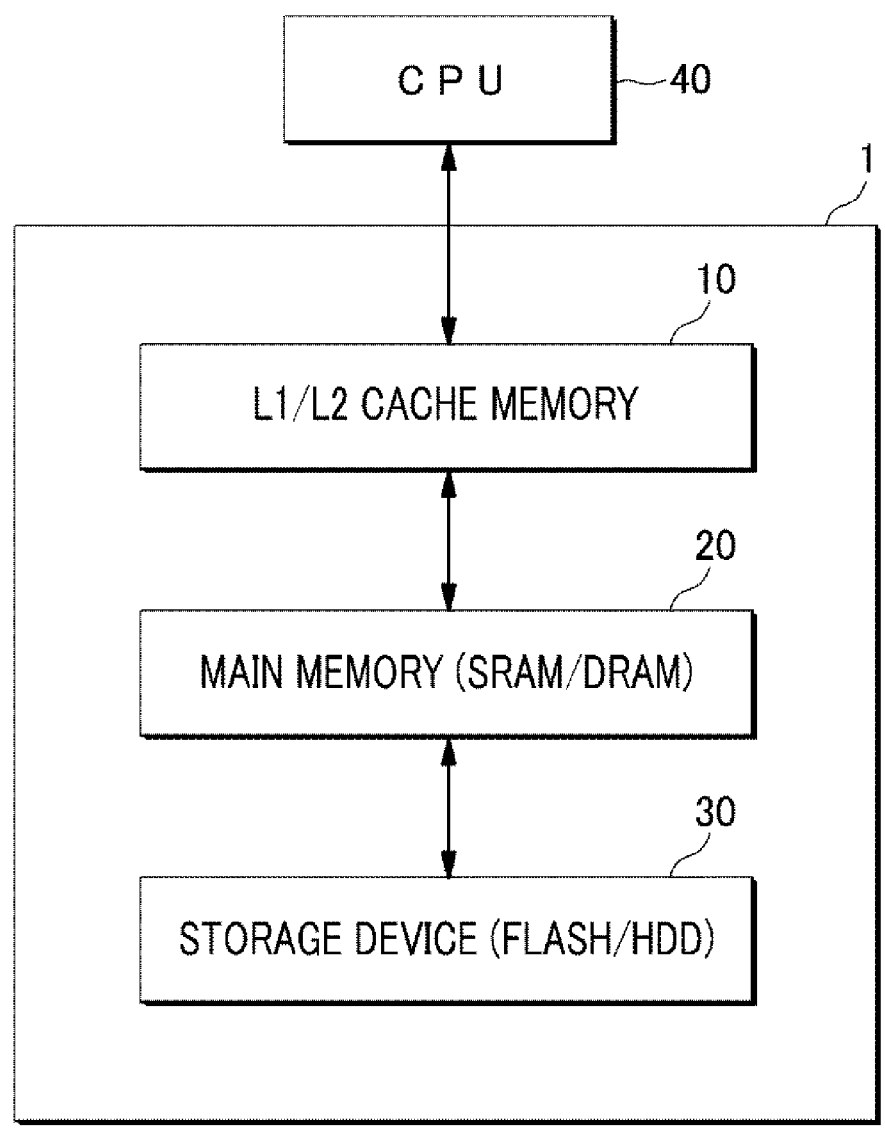
FIG. 1 illustrates a memory layer structure applied to a memory system according to a conventional technology.

Hereinafter, illustrative embodiments of the present disclosure will be described in detail with reference to the accompanying drawings so that inventive concept may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the term "comprises or includes" and/or "comprising or including" used in the document means that one or more other components, steps, operations, and/or the existence or addition of elements are not excluded in addition to the described components, steps, operations and/or elements.

Figure 2:
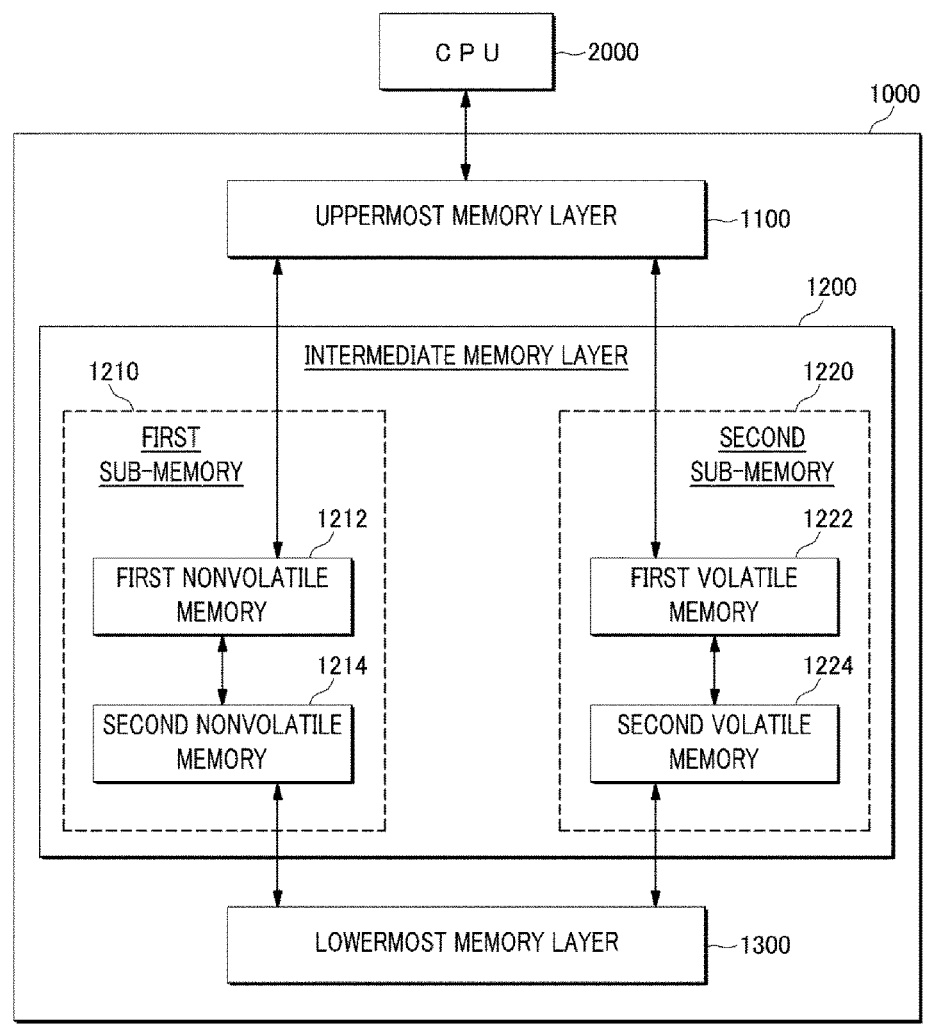
FIG. 2 illustrates a memory system including a nonvolatile memory and a volatile memory in accordance with an illustrative embodiment of the present disclosure.
Figure 3:
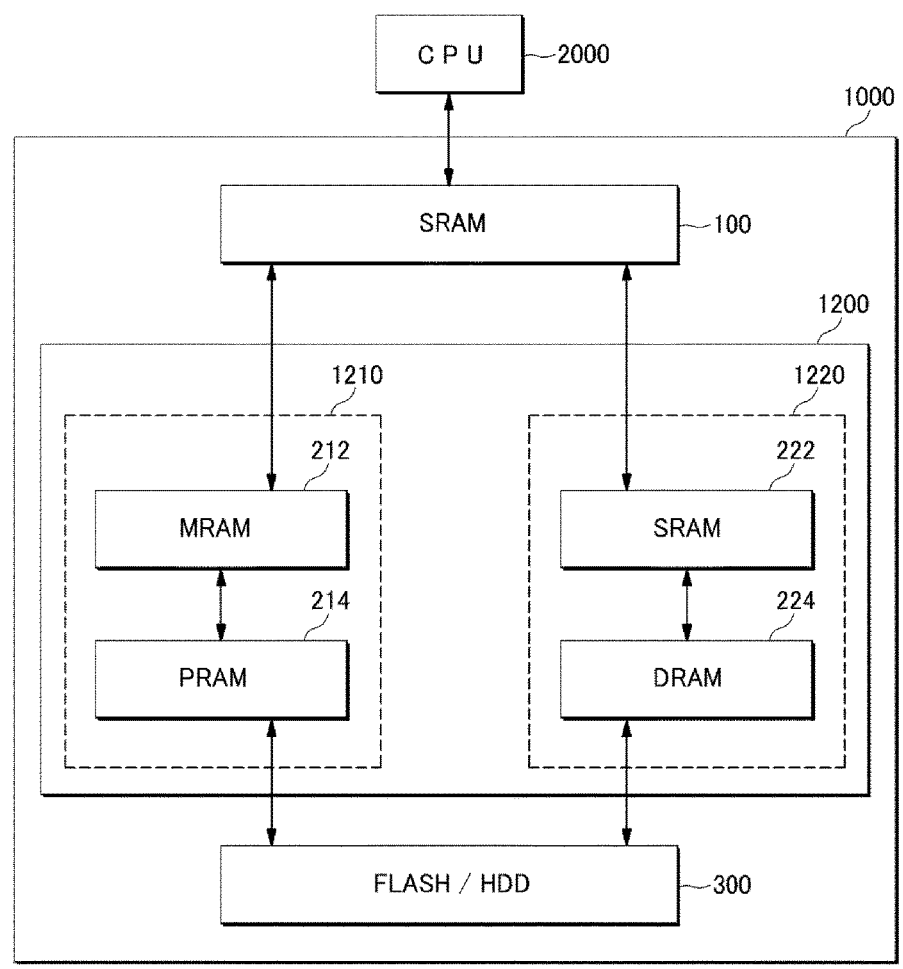
FIG. 3 illustrates a memory system including a nonvolatile memory and a volatile memory in accordance with an illustrative embodiment of the present disclosure.

FIGS. 2 and 3 illustrate a memory system including a nonvolatile memory and a volatile memory in accordance with an illustrative embodiment of the present disclosure.

A memory system 1000 in accordance with an illustrative embodiment of the present disclosure includes an uppermost memory layer 1100, an intermediate memory layer 1200, and a lowermost memory layer 1300.

The intermediate memory layer 1200 includes the first sub-memory 1210 and the second sub-memory 1220.

In an illustrative embodiment of the present disclosure, the first sub-memory 1210 may include at least one nonvolatile memory such as a first nonvolatile memory 1212 and a second nonvolatile memory 1214. Similarly, the second sub-memory 1220 may include at least one volatile memory such as first volatile memory 1222 and a second volatile memory 1224.

A central processing unit (CPU) 2000 fetches data stored in the lowermost memory layer 1300 via the intermediate memory layer 1200 to execute a certain program or for other purposes. The fetched data are stored in the uppermost memory layer 1100 and the intermediate memory layer 1200.

Later, when the data needs to be accessed again, the central processing unit 2000 can quickly perform a read or write operation by using the data stored in the uppermost memory layer 1100 which has the fastest read/write speeds of all.

The uppermost memory layer 1100 may include a L1 or L1 and L2 cache memory and others, and may consist of a volatile memory such as SRAM or DRAM as shown in FIG. 3. The uppermost memory layer 1100 receives a request for specific data for reading and writing from the central processing unit (CPU) 2000 and searches the requested data to see whether the requested data are stored in the uppermost memory layer 1100.

If the requested data for read or write operation does not exist in the uppermost memory layer 1100, i.e., a reference failure (cache miss) occurs, the uppermost memory layer 1100 asks the intermediate memory layer 1200 for the data for which the reference failure occurred.

That is, when a reference failure occurs, the uppermost memory layer 1100 requests the first sub-memory 1210 and the second sub-memory 1220 of the intermediate memory layer 1200 for the reference failed data.

The intermediate memory layer 1200 is a memory layer with lower read/write speed performances than those of the uppermost memory layer 1100. However, the intermediate memory layer 1200 may have higher memory density than that of the uppermost memory layer 1100.

If the requested data exist in the first sub-memory 1210 or the second sub-memory 1220, the uppermost memory layer 1100 can acquire the data from either the first sub-memory 1210 or the second sub-memory 1220.

The first sub-memory 1210 may consist of lower-cost memories with lower read/write speed performances than those of the second sub-memory 1220. Although the read/write speed performances of a nonvolatile memory are lower than those of a volatile memory, the read speed of the nonvolatile memory is relatively superior to the write speed thereof. In general, since a read operation of a memory is faster than a write operation thereof, the difference between the read speed and the write speed of a nonvolatile memory is larger than the difference between the read speed and the write speed of a volatile memory.

Accordingly, the first sub-memory 1210 consisting of nonvolatile memories, the difference between the read and write speeds of the first sub-memory 1210 may be larger than the difference between the read and write speeds of the second sub-memory 1220 consisting of volatile memories. That is, although the read/write speeds of the first sub-memory 1210 are lower than the read/write speeds of the second sub-memory 1220, if comparing the read speed and the write speed of the first sub-memory 1210, the read speed performance of the first sub-memory 1210 is superior to the write speed performance thereof.

Referring to FIGS. 2 and 3, the nonvolatile memory included in the first sub-memory 1210 may include an MRAM 212, a PRAM 214, a FRAM (not illustrated) or others. If multiple nonvolatile memories are included, physical location of the nonvolatile memories can be determined such that among the nonvolatile memories, the nonvolatile memory with the fastest memory access is placed closest to the uppermost memory layer 1100.

The volatile memory included in the second sub-memory 1220 may include a SRAM 222, a DRAM 224 or others. If multiple volatile memories are included, physical location of the volatile memories can be determined such that among the volatile memories, the volatile memory with the fastest memory access is placed closest to the uppermost memory layer 1100.

If the read reference failed data in the uppermost memory layer 1100 do not exist in both the first sub-memory 1210 and the second sub-memory 1220, the first sub-memory 1210 loads the reference failed data from the lowermost memory layer.

The first sub-memory 1210 may include multiple nonvolatile memories with different read speeds, e.g., a second nonvolatile memory 1212 and a second nonvolatile memory 1214 with a slower memory access speed than that of the first nonvolatile memory 1212.

As described above, the first sub-memory 1210 includes multiple nonvolatile memories with different memory access speeds with respect to each other. When a request for a memory reference is made by the uppermost memory layer 1100, the requested data can be searched first in the first nonvolatile memory 1212 and then the second nonvolatile memory 1214 based on the access speeds thereof.

If the write reference failed data in the uppermost memory layer 1100 do not exist in both the first sub-memory 1210 and the second sub-memory 1220, the second sub-memory 1220 loads the reference failed data from the lowermost memory layer.

The second sub-memory 1220 may include multiple volatile memories with different access speeds, e.g., a first volatile memory 1222 and a second volatile memory 1224 with a relatively slower access speed than that of the first volatile memory 1222.

As described above, the second sub-memory 1220 includes multiple volatile memories with different access speeds with respect to each other. When a request for a memory reference is made by the uppermost memory layer 1100, the requested data can be searched first in the first volatile memory and then the second volatile memory based on the access speeds thereof.

The lowermost memory layer 1300 stores all the data for execution of a program. The lowermost memory layer 1300 consists of a nonvolatile memory and may include a flash memory or a hard disk drive (HDD) 300 as shown in FIG. 3.

In response to a request from the central processing unit 2000, the lowermost memory layer 1300 provides the requested data to the central processing unit 2000 through the intermediate memory layer 1200 and the uppermost memory layer 1100.

Meanwhile, when loading data initially, the second sub-memory 1220 may load the data from the lowermost memory layer 1300 to provide the data to the uppermost memory layer 1100. Similarly, in an illustrative embodiment of the present disclosure, the data provided for the first time from the lowermost memory layer 1300 to the uppermost memory layer 1100 are initially provided to the uppermost memory layer 1100 through the second sub-memory 1220 consisting of a volatile memory. Then, when a memory reference failure occurs in the uppermost memory layer 1100, the uppermost memory layer 1100 requests the corresponding data to both the first sub-memory 1210 and the second sub-memory 1220 so as to receive the corresponding data from the first sub-memory 1210 and the second sub-memory 1220.

If the requested data do not exist in the first sub-memory 1210 and the second sub-memory 1220, read reference failed data are loaded by the first sub-memory 1210, and write reference failed data are loaded by the second sub-memory 1220 so that the data can be provided to the uppermost memory layer 1100 later.

Accordingly, all the initially loaded data are loaded to the second sub-memory 1220, but as a read or write reference failure occurs in the uppermost memory layer 1100, data with a high possibility for a read reference may be stored in the first sub-memory 1210, and data with a high possibility for a write reference may be stored in the second sub-memory.

As described above, while the memory access speeds of the first sub-memory 1210 is slower than those of the second sub-memory 1220, the read speed performance of the first sub-memory 1210 is relatively superior to the write speed performance of the first sub-memory 1210. Therefore, the intermediate memory layer 1200 can effectively handle data by making the best use of each memory's strong point.

Figure 4:
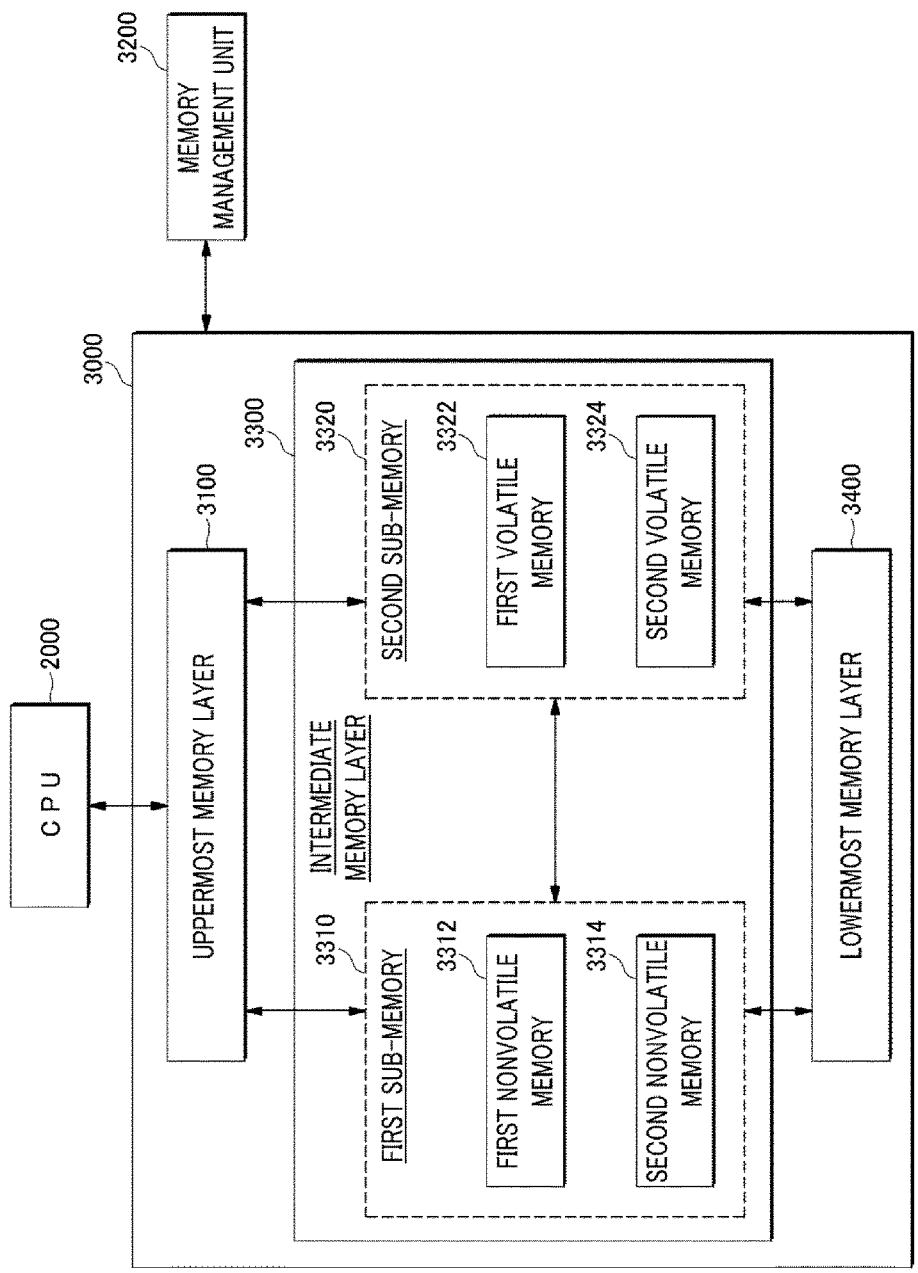
FIG. 4 illustrates a memory system including a nonvolatile memory and a volatile memory in accordance with another illustrative embodiment of the present disclosure.
Figure 5:
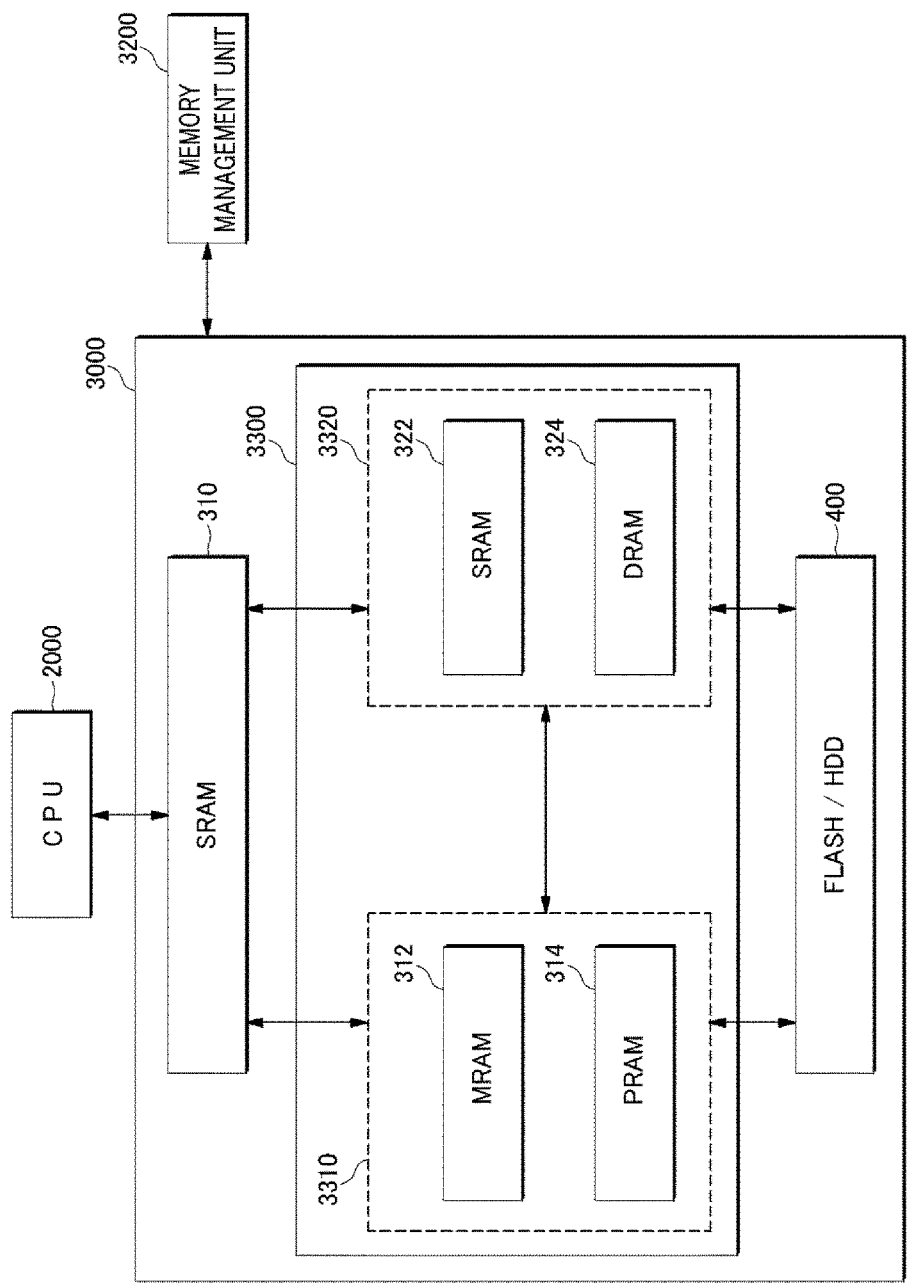
FIG. 5 illustrates a memory system including a nonvolatile memory and a volatile memory in accordance with another illustrative embodiment of the present disclosure.

FIGS. 4 and 5 illustrate a memory system including a nonvolatile memory and a volatile memory in accordance with another illustrative embodiment of the present disclosure.

A memory system 3000 in accordance with another illustrative embodiment of the present disclosure includes an uppermost memory layer 3100, a memory management unit 3200, an intermediate memory layer 3300 and a lowermost memory layer 3400.

As depicted in FIG. 4, a central processing unit (CPU) 2000 loads data stored in the lowermost memory layer 3400 through the intermediate memory layer 3300 to execute a certain program or for other purposes. Later, when the data needs to be accessed again, the central processing unit 2000 can quickly perform a read or write operation by using the data stored in the uppermost memory layer 3100 instead of the lowermost memory layer 3400.

The uppermost memory layer 3100 includes a L1 cache or L1 and L2 cache memory or others, and consists of volatile memories such as a SRAM 310 as shown in FIG. 5. The uppermost memory layer 3100 receives a read/write request for certain data from the central processing unit (CPU) 2000, and searches the requested data from a memory of the uppermost memory layer 3100.

If the requested data for read or write operation do not exist in the memories of the uppermost memory layer 3100, i.e., a reference failure (cache miss) occurs, the uppermost memory layer 3100 requests the reference failed data to the intermediate memory layer 3300.

When the reference failure occurs, the uppermost memory layer 3100 requests the reference failed data to the first sub-memory 3310 and the second sub-memory 3320. If the requested data exist in the first sub-memory 3310 or the second sub-memory 3320, the uppermost memory layer 3100 can acquire the data from the first sub-memory 3310 or the second sub-memory 3320.

Like aforementioned embodiment, in the embodiment illustrated in FIGS. 4 and 5 the first sub-memory 3310 may include at least one nonvolatile memory such as a first nonvolatile memory 3312 and a second nonvolatile memory 3314. The second sub-memory 3320 may include at least one volatile memory such as a first volatile memory 3322 and a second volatile memory 3324. That is, the first sub-memory 3310 may consist of lower-cost memories with lower read/write speed performances than those of the second sub-memory 3320. Although the read/write speeds of the nonvolatile memory are slower than the read/write speeds of the volatile memory, if comparing only the read and write speeds of the nonvolatile memory, the read speed of the nonvolatile memory is superior to the write speed thereof. In general, since a read speed of a memory is faster than a write speed thereof, the difference between the read and write speeds of the nonvolatile memory is larger than the difference between the read and write speeds of the volatile memory. As shown in FIG. 5, the nonvolatile memory included in the first sub-memory 3310 may include an MRAM 312, a PRAM 314, a FRAM (not illustrated) or others. If multiple nonvolatile memories are included, physical location of the nonvolatile memories can be determined such that a nonvolatile memory with a higher access speed is placed closer to the uppermost memory layer 3100.

In addition, the volatile memory included in the second sub-memory 3320 may include a SRAM 322 or a DRAM 324. If multiple volatile memories are included, physical location of the volatile memories can be determined such that a volatile memory with a higher write speed is placed closer to the uppermost memory layer 3100.

The memory management unit 3200 controls the process the reference failed data in the uppermost memory layer 3100 is loaded from the lowermost memory layer 3400 to the intermediate memory layer 3300.

That is, if the reference failed data in the uppermost memory layer 3100 do not exist in the intermediate memory layer, the memory management unit 3200 loads the corresponding data from the lowermost memory layer 3400 to the intermediate memory layer 3300.

In another illustrative embodiment of the present disclosure unlike an illustrative embodiment of the present disclosure described above, the memory management unit 3200 loads all of the reference failed data to the second sub-memory 3320, irrespective of the type of the reference failure, i.e., regardless of whether it is a read reference failure or a write reference failure, that has occurred in the uppermost memory layer 3100.

The memory management unit 3200 also records the reference type of operation per data to determine which of a read reference or a write reference is mostly made in the uppermost memory layer 3100 for each data.

The memory management unit 3200 loads a reference failed block to the second sub-memory 3320. When the storage capacity of the second sub-memory 3320 is less than a certain threshold value, the memory management unit 3200 transfers data with a high occurrence rate for a read reference from the second sub-memory 3320 to the first sub-memory 3310 to be stored therein. For example, the threshold value may be determined between 0% and 25%. The threshold value of 0% indicates that the storage capacity of the second sub-memory 3320 has been exhausted and there is no more available space to store data. To decide whether the storage capacity has been exhausted, it may be determined whether the whole capacity is fully exhausted in case of using a fully associative mapping, while it may be determined whether the capacity of the set into which a reference failed block can be stored is fully exhausted in case of using a set-associative mapping.

The data to which only read references have been made in the uppermost memory layer 3100 may refer to those data which have been used only for reading operation without being changed. Such stored data that have been used only for reading and have not been changed in content is referred to as a clean data block.

To the contrary, data to which a write reference has been made in the uppermost memory layer 3100 may mean those data which have been changed in content. Such stored data that have been changed in content is referred to as a dirty data block.

Primarily, every time the storage capacity of the second sub-memory 3320 becomes less than a certain threshold value, the clean data blocks may be transferred to the first sub-memory 3310 and stored therein. As a result of the operation, the clean data blocks may be stored in the first sub-memory 3310, while the dirty data blocks may be stored in the second sub-memory 3320.

If there is no more clean data blocks in the second sub-memory 3320, read and write reference occurrence rates for each of the dirty data blocks are calculated. Then data in the second sub-memory 3320 may be stored in the first sub-memory 3310 according to the above-described algorithm. Or, a certain block may be selected from the dirty data blocks of the second sub-memory 320 by using a general block replacement method and the selected block may be stored in the first sub-memory 3310.

Therefore, when a reference failure occurs in the uppermost memory layer 3100 later, the uppermost memory layer can acquire read reference failed data from the first sub-memory 3310, and write reference failed data from the second sub-memory 3320.

According to the above-described illustrative embodiment of the present disclosure, while the memory access speed of the first sub-memory 3310 is slower than that of the second sub-memory 3320, the read speed performance of the first sub-memory 3310 is relatively superior to the write speed performance thereof. Therefore, the intermediate memory layer 3300 can effectively handle data by making the best use of strong points of each of the memories.

The first sub-memory 3310 may include multiple nonvolatile memories having different access speeds, e.g., a first nonvolatile memory 3312 and a second nonvolatile memory 3314 with a relatively lower access speed compared to that of the first nonvolatile memory 3312.

The first sub-memory 3310 can receive and store the data with a high occurrence rate for a read reference from the second sub-memory 3320, and in response to a request from the uppermost memory layer 3100, can provide the requested data to the uppermost memory layer 3100 under the control of the memory management unit 3200.

The second sub-memory 3320 loads data to be initially provided to the uppermost memory layer 3100 from the lowermost memory layer 3400 and provides the data to the uppermost memory layer 3100. Also, the second sub-memory 3320 acquires data that a memory reference failure occurred in the uppermost memory layer 3100 and do not exist both in the first sub-memory 3310 and the second sub-memory 3320, from the lowermost memory layer 3400 and provides the data to the uppermost memory layer 3100.

In response to a request from the memory management unit 3320, the second sub-memory 3320 transmits the data requested by the memory management unit 3200 among the data stored in the second sub-memory 3320, to the first sub-memory 3310. As described above, the data to be transmitted from the second sub-memory 3320 to the first sub-memory 3310 may include data with a high occurrence rate for a read reference.

The second sub-memory 3320 may include multiple volatile memories having different read speeds, e.g., a first volatile memory 3322 and a second volatile memory 3324 with a relatively slow access speed compared to the first volatile memory 3322.

The lowermost memory layer 3400 stores all data for execution of a program. The lowermost memory layer 3400 consists of a nonvolatile memory and may include a flash memory or a hard disk drive (HDD) 400 as shown in FIG. 5.

In response to a request from the central processing unit 2000, the lowermost memory layer 3400 provides the stored data to the central processing unit 2000 through the uppermost memory layer 3100 and the intermediate memory layer 3300.

In the aforementioned illustrative embodiment of the present disclosure, the memory management unit 3200 has been explained as a separate component of the memory system 3000. However, the present disclosure is not limited thereto. The memory management unit 3200 may be included in the memory system 3000 or the central processing unit (CPU) 2000.

In the description provided above, the memory management unit has been explained with respect to only the embodiments illustrated in FIGS. 4 and 5. However, the present disclosure is not limited thereto. The memory system according to the embodiments illustrated in FIGS. 2 and 3 may also include the memory management unit.

In this case, the memory management unit in an illustrative embodiment of the present disclosure determines the type of the reference failure that has occurred in the uppermost memory layer. When a read reference failure has occurred, the memory management unit can load the corresponding data to the first sub-memory including at least one nonvolatile memory. When a write reference failure has occurred, the memory management unit can load the corresponding data to the second sub-memory including at least one volatile memory.

Figures 6, 7:
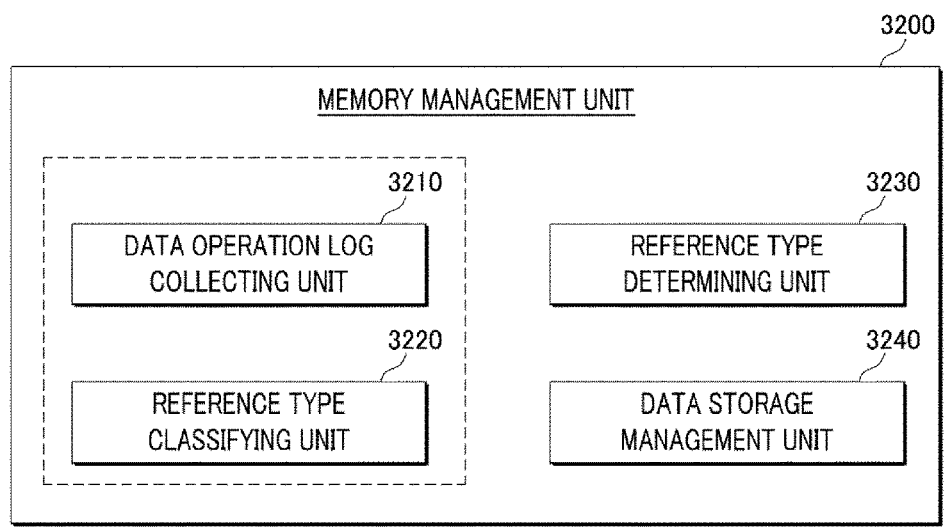
FIG. 6 illustrates a configuration of a memory management unit in accordance with an illustrative embodiment and another illustrative embodiment of the present disclosure.
FIG. 7 is a table showing types and characteristics of a volatile memory and a nonvolatile memory applied to an illustrative embodiment of the present disclosure.

FIG. 6 illustrates configuration of the memory management unit 3200 in accordance with one illustrative embodiment and another illustrative embodiment of the present disclosure.

The memory management unit 3200 in accordance with another illustrative embodiment of the present disclosure includes a data operation log collecting unit 3210, a data reference type classifying unit 3220, a reference type determining unit 3230 and a data storage management unit 3240.

The data operation log collecting unit 3210 collects the type of a reference that occurred in the uppermost memory layer (not illustrated) per data. That is, the data operation log collecting unit 3210 collects and records the number of read/write references and others for each data.

The data reference type classifying unit 3220 classifies the reference type for each data based on the records collected by the data operation log collecting unit 3210.

That is, based on the number of times of read and write references per data collected by the data operation log collecting unit 3210, the data reference type classifying unit 3220 determines which of read reference or write reference is mostly made for the corresponding data and decides the reference type of the data based on the determination result.

The data reference type classifying unit 3220 may determine the reference type based on a ratio of the number of read references and the number of write references.

The reference type determining unit 3230 determines the type of a reference that occurred in the uppermost memory layer. That is, when a reference is made in the uppermost memory layer, the reference type determining unit 3230 determines whether the reference is a read reference or a write reference.

The data storage management unit 3240 stores data of the lowermost memory layer in the first or second sub-memory based on predefined criteria.

That is, if the data storage management unit 3240 is set to load data of the lowermost memory layer to the first or second sub-memory depending on a reference type of the data after a reference failure occurs in the uppermost memory layer, the data storage management unit 3240 stores the corresponding data in the first or second sub-memory based on the reference type of the reference failed data that occurred in the uppermost memory layer.

For example, in the case that a reference failure that occurred in the uppermost memory layer is related to a read reference, the data storage management unit 3240 may store the corresponding data in the first sub-memory of the intermediate memory layer including at least one nonvolatile memory.

And if a reference failure that occurred in the uppermost memory layer is related to a write reference, the data storage management unit 3240 may load the corresponding data to the second sub-memory of the intermediate memory layer including at least one volatile memory.

Unlike this, in the case that the data storage management unit 3240 is set to load data of the lowermost memory layer to the second sub-memory including at least one volatile memory, the data storage management unit 3240 may first load the data of the lowermost memory layer to the second sub-memory, irrespective of the reference type of the data to which a reference failure occurred in the uppermost memory layer.

In this case, the data storage management unit 3240 determines whether the storage capacity of the second sub-memory is less than a certain threshold value. If the storage capacity of the second sub-memory is less than the certain threshold value, the data storage management unit 3240 may store, among the data stored in the second sub-memory, data determined as having read reference type (e.g., clean data blocks) by the reference type determining unit 3230 into the first sub-memory including at least one nonvolatile memory.

FIG. 7 is a table showing types and characteristics of the volatile and nonvolatile memories applied in an illustrative embodiment of the present disclosure.

As shown in FIG. 7, read characteristics of the nonvolatile memories MRAM and PRAM are similar or slightly inferior to those of the volatile memories eDRAM and SRAM. However, write characteristics of the nonvolatile memories MRAM and PRAM are significantly inferior to that of the volatile memory SRAM.

In addition, the nonvolatile memories MRAM and PRAM have high density, compared to that of the volatile memories eDRAM and SRAM. Accordingly, when having the same capacity, the nonvolatile memory occupies smaller space than the volatile memory.

Figure 8:
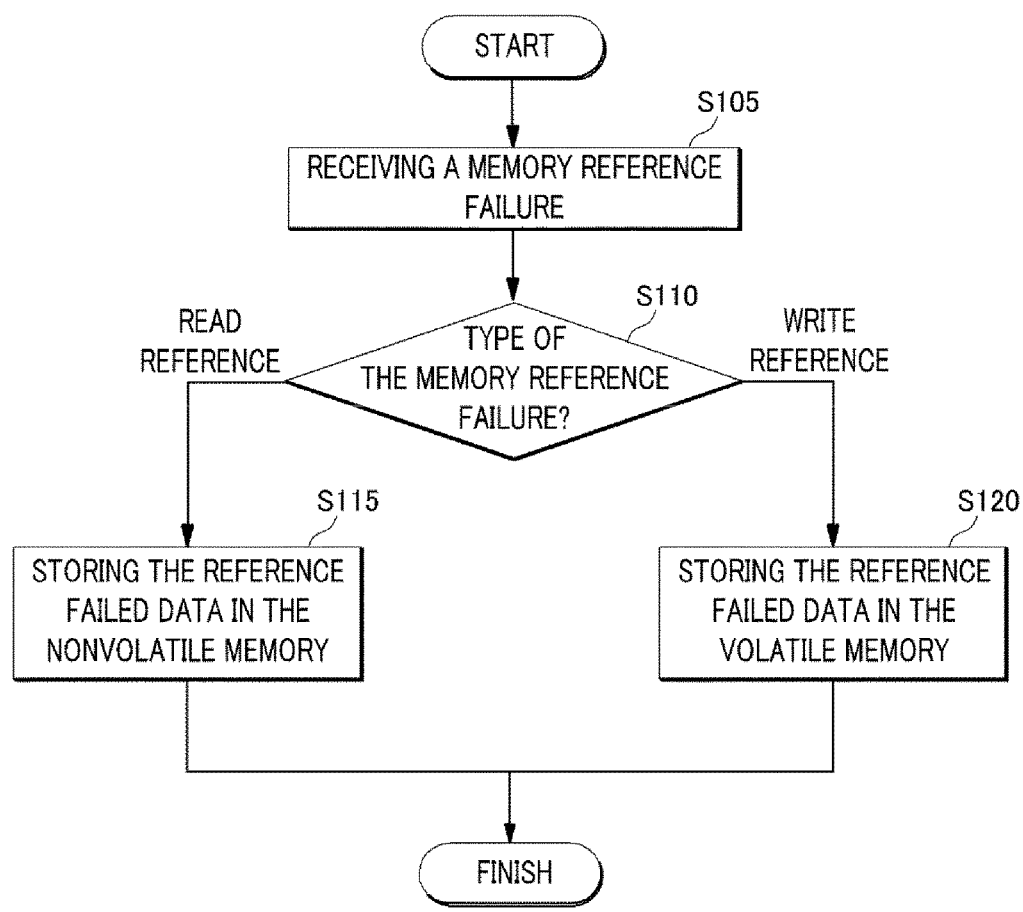
FIG. 8 is a flow diagram showing how the memory management unit performs a memory loading operation in an illustrative embodiment of the present disclosure.

FIG. 8 illustrates a flow diagram as to how the memory management unit performs a memory loading operation in an illustrative embodiment of the present disclosure.

In S105, the memory management unit receives memory reference failure information for certain data from the uppermost memory layer.

In S110, the memory management unit determines the reference type of the reference failure based on the memory reference failure information received in S105. That is, the memory management unit determines whether the data to which a reference failure occurred in the uppermost memory layer exist in the intermediate memory layer, based on the memory reference failure information received in S105. If the reference failed data do not exist in the intermediate memory layer, the memory management unit determines whether the reference failure that occurred in the uppermost memory layer is related to a read reference or a write reference.

In S115, if it is determined in S110 that a read reference failure occurred, the memory management unit loads the read reference failed data from the lowermost memory layer to the first sub-memory including at least one nonvolatile memory.

In S120, if it is determined in S110 that a write reference failure occurred, the memory management unit loads the write reference failed data from the lowermost memory layer to the second sub-memory including at least one volatile memory.

When a reference failure occurs in the uppermost memory layer, the data which was loaded to the first sub-memory or the second sub-memory depending on the types of the reference failures in S115 and S120 can be provided from the first sub-memory or the second sub-memory to the uppermost memory layer in accordance with a request of the uppermost memory layer.

Figure 9:
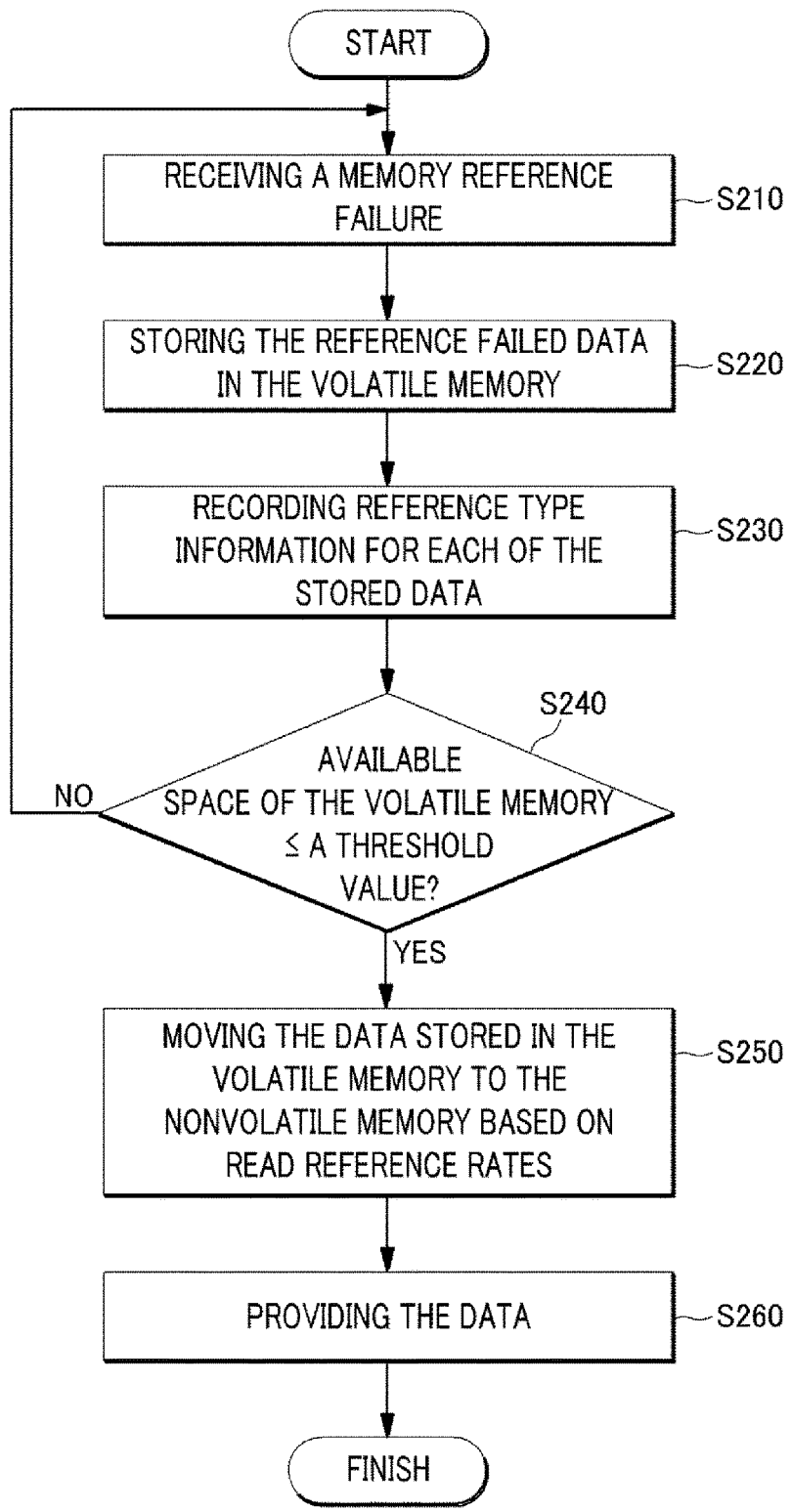
FIG. 9 is a flow diagram showing how the memory management unit loads data which have been loaded in a volatile memory of an intermediate memory layer to a nonvolatile memory in another illustrative embodiment of the present disclosure.

FIG. 9 is a flow diagram as to how the memory management unit loads the data which have been loaded to the volatile memory of the intermediate memory layer to the nonvolatile memory.

In S210, the memory management unit receives the memory reference failure information from the uppermost memory layer. The received memory reference failure information includes information of the reference failed data and information of the type of the reference failure.

In S220, the memory management unit acquires the reference failed data from the lowermost memory layer based on the memory reference failure information received in S210 and loads the data to the second sub-memory including at least one volatile memory.

In S230, the memory management unit records reference type information per data that was loaded in S220. That is, since the memory management unit records the reference type by data each time the reference is made, the memory management unit can generate information about which reference type is made how many for each data.

Accordingly, the memory management unit can calculate the occurrence rate of read references and the occurrence rate for write references for each data.

Here, recording the reference type includes merely identifying clean data blocks and dirty data blocks which means it can simply see whether there has been change in content.

In S240, the memory management unit determines whether the available storage space of the second sub-memory including at least one volatile memory to which the reference failed data is loaded in S220 is less than a certain threshold value.

If the process of loading the reference failed data to the second sub-memory in S220 is repeated, the amount of data loaded into the second sub-memory increases. As a result, the load capacity of the second sub-memory gradually is diminished.

Accordingly, the memory management unit determines whether the amount of available space, i.e., storage capacity or load capacity of the second sub-memory is less than a certain threshold value. For example, the memory management unit may determine whether there is storage space left in the second sub-memory available for storing a new memory block. In case of using a fully associative mapping method, the determination is performed based on whether the whole space has been fully used. In case of using a set-associative mapping method, the determination can be performed based on whether the space of the set into which a reference failed block can be stored has been fully used.

In S250, if it is determined in S240 that the load capacity of the second sub-memory is less than a certain threshold value, the memory management unit calculates a read reference rate for each of the data loaded in the second sub-memory based on the reference type information per data recorded in S230. Based on the calculated read reference rate, the memory management unit moves the data loaded in the second sub-memory to the first sub-memory including at least one nonvolatile memory.

That is, the memory management unit stores data which have a higher read reference rate among the data stored in the second sub-memory into the first sub-memory including at least one nonvolatile memory so as to enable the second sub-memory to secure some space for storing reference failed blocks. Also, the memory management unit stores data which have a higher read reference rate, i.e., a higher read reference occurrence rate, into the first sub-memory including a nonvolatile memory that has a superior read speed compared to a write speed thereof. As the data which have a higher read reference occurrence rate, clean data blocks can be first selected.

In S260, the memory management unit searches data stored in the first and second sub-memories among the data to which a reference failure occurred in the uppermost memory layer, and provides the data to the uppermost memory layer.

As S210 and S260 are repeated, the data having a higher read reference occurrence rate are eventually stored in the first sub-memory including at least one nonvolatile memory, and the data having a higher write reference occurrence rate are stored in the second sub-memory including at least one volatile memory. As a result, the efficiency of the data processing depending on the characteristics of the memories can be improved.

The illustrative embodiments can be embodied in a storage medium including instruction codes executable by a computer or processor such as a program module executed by the computer or processor. A data structure in accordance with the illustrative embodiments can be stored in the storage medium executable by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The method and the system of the present disclosure have been described in relation to the certain examples. However, the components or parts or all the operations of the method and the system may be embodied using a computer system having universally used hardware architecture.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

The invention claimed is:

1. A memory system, comprising:
   a first sub-memory comprising at least one nonvolatile memory;
   a second sub-memory comprising at least one volatile memory;
   wherein in response to a memory reference failure that has occurred in a cache memory, a reference failed data is always first loaded and stored to the second sub-memory from a storage regardless of the type of the memory reference failure, all the data stored to the second sub-memory from the storage is transferred and stored to the first sub-memory, the first-sub-memory only stores data transferred from the second sub-memory, and all the data of the first sub-memory transferred from the second sub-memory is sent to the cache memory.

2. The memory system of claim 1, wherein the first sub-memory and second sub-memory are included in same memory layer and the memory layer is placed between a cache memory layer and a storage layer.

3. The memory system of claim 1, wherein the reference failed data comprises a read reference failed data or a write reference failed data.

4. In a memory system having a first sub-memory and a second sub-memory, a method for managing the memory system comprising:
   in response to a memory reference failure that has occurred in a cache memory,
   always first loading and storing a reference failed data to the second sub-memory from a storage regardless of the type of the memory reference failure;
   transferring all the data stored to the second sub-memory into the first sub-memory when a data load capacity of the second sub-memory is less than or equal to a predetermined threshold value; and
   sending all the data of the first sub-memory transferred from the second sub-memory to the cache memory,
   wherein the first sub-memory comprises at least one nonvolatile memory, and the second sub-memory comprises at least one volatile memory.

5. The method of claim 4, wherein the first sub-memory and second sub-memory are included in same memory layer and the memory layer is placed between a cache memory layer and a storage layer.

6. The method of claim 4, wherein the reference failed data comprises a read reference failed data or a write reference failed data.

7. A memory system having multiple memory layers, the memory system comprising:
   a first memory layer comprising a volatile memory; and
   a second memory layer comprising a first sub-memory and a second sub-memory, wherein the first sub-memory comprises different types of nonvolatile memory, the second sub-memory comprises at least one volatile memory,
   wherein in response to a memory reference failure has occurred in the first memory layer, a reference failed data is always first loaded and stored to the second sub-memory from a lower level memory layer, all the data stored to the second sub-memory from the lower level memory layer is transferred and stored to the first sub-memory, and all the data of the first sub-memory transferred from the second sub-memory is sent to the first memory layer.

8. The memory system of claim 7, wherein the reference failed data comprises a read reference failed data or a write reference failed data.

9. The memory system of claim 1, wherein when the storage capacity of the second sub-memory is less than a preset threshold value, data with a high occurrence rate for a read reference in the second sub-memory are transferred to the first sub-memory.

10. The memory system of claim 1, wherein the data stored to the second sub-memory is transferred to the first sub-memory when a data load capacity of the second sub-memory is less than or equal to a predetermined threshold value.

11. The memory system of claim 1, wherein the first sub-memory includes different types of nonvolatile memory.

12. The method of claim 4, wherein the first sub-memory only stores data transferred from the second sub-memory.

13. The method of claim 4, wherein the first sub-memory includes different types of nonvolatile memory.

14. The memory system of claim 7, wherein the data stored to the second sub-memory is transferred to the first sub-memory when a data load capacity of the second sub-memory is less than or equal to a predetermined threshold value.

15. The memory system of claim 7, wherein the first sub-memory only stores data transferred from the second sub-memory.

16. The memory system of claim 7, wherein the first sub-memory and second sub-memory are included in same memory layer and the memory layer is placed between a cache memory layer and a storage layer.

* * * * *